INVENTOR.
William J. Clayton

Feb. 27, 1973   W. J. CLAYTON   3,718,059
PERMEABLE THERMOPLASTIC FILM PRODUCT AND METHOD
Filed Dec. 18, 1969   4 Sheets-Sheet 4
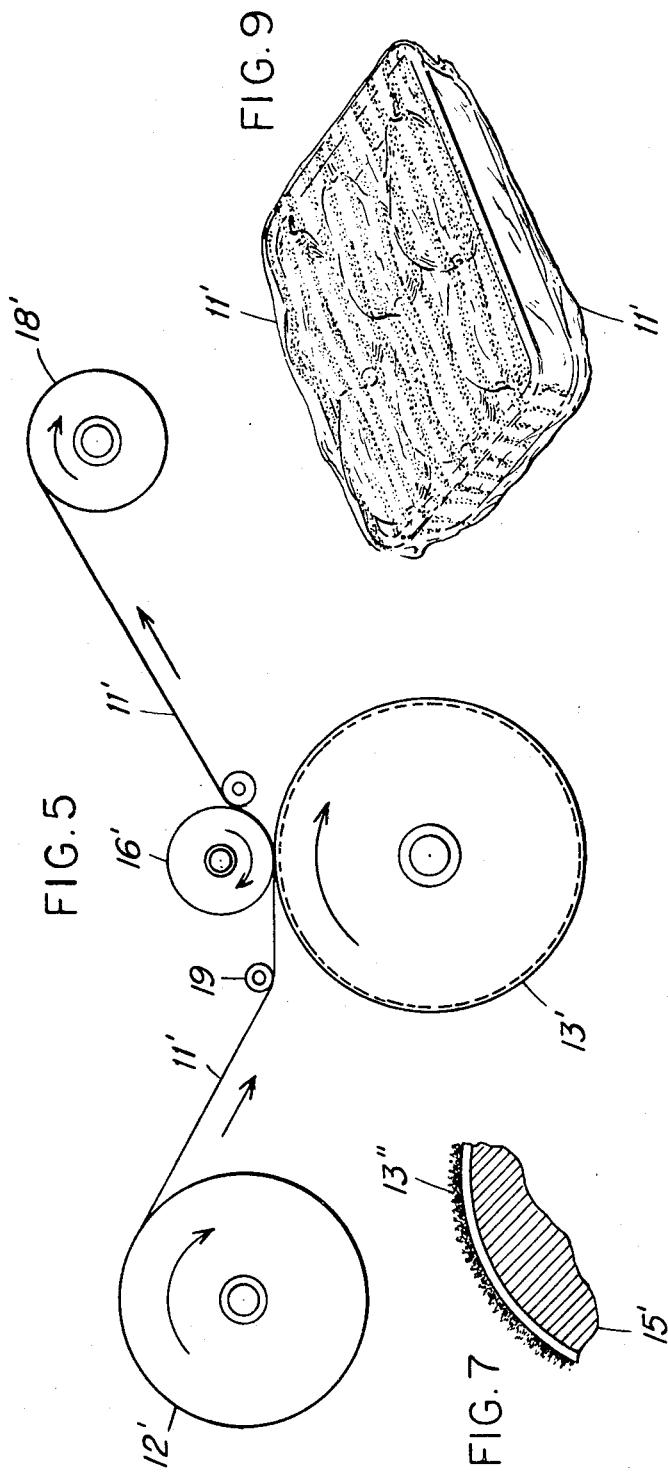
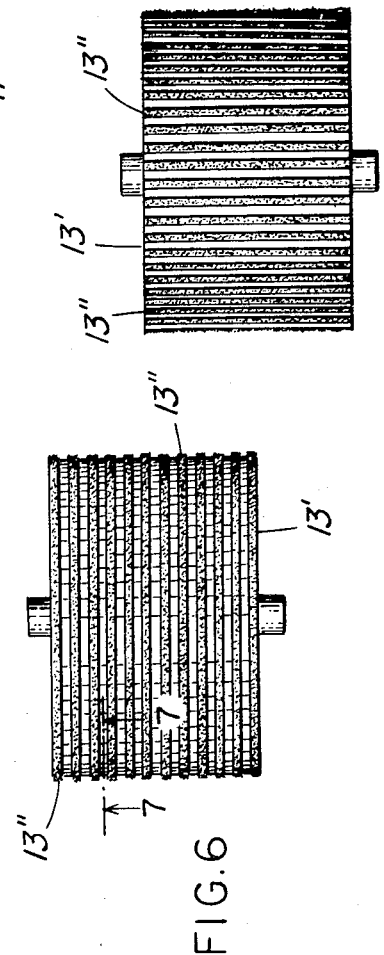
INVENTOR.
William J. Clayton

United States Patent Office

3,718,059
Patented Feb. 27, 1973

3,718,059
PERMEABLE THERMOPLASTIC FILM PRODUCT AND METHOD
William J. Clayton, Fairport, N.Y., assignor to Mobil Oil Corporation
Continuation-in-part of application Ser. No. 676,560, Oct. 19, 1967. This application Dec. 18, 1969, Ser. No. 886,272
Int. Cl. B26f 1/00
U.S. Cl. 83—2
9 Claims

ABSTRACT OF THE DISCLOSURE

The present invention relates to a thermoplastic film product and a method employed to increase the permeability of thermoplastic films by pressing such films, utilizing a resilient surface pressure roller, into contact with a discontinuous surface of a coated abrasive material whereby highly permeable films are produced which permit controlled passage of gases or vapors such as moisture vapor therethrough.

CROSS REFERENCES TO RELATED APPLICATIONS

The present application is a continuation-in-part of U.S. patent application Ser. No. 676,560, filed Oct. 19, 1967.

BACKGROUND OF THE INVENTION

(I) Field of the invention

The present invention relates to an improved method for employment in the manufacture of novel thermoplastic film products which have controlled gas or vapor transmission rates and which are otherwise impervious, or at least resistant, to the transmission of liquids or solids therethrough. Such film materials have found numerous end use applications, for example in the fabrication of bags or film material suitable for the packaging of moisture-emitting fresh produce or meats. Other applications for such permeable films include clothing such as raincoats, liners, baby-pants materials, filters, construction film, upholstery and many others.

More particularly, the present invention is concerned with a method for the treatment of thermoplastic sheets in such a manner as to increase the permeability thereof. This may be accomplished, in accord with one embodiment of the process of the present invention, by forming holes or perforations in selected areas of the total surface subjected to the pressure application of a coated abrasive surface either with or without the employment of elevated temperatures. Such a method results in the formation of permeable films of high mechanical strength and characterized by having a relatively uniform distribution of micropores which permit controlled or limited passage of gas and moisture vapor but inhibits the passage of liquids. The perforations or micropores formed in films produced in accord with a particular embodiment of the present method are characterized by having a peripheral beaded area immediately surrounding the performation, e.g. when heat is employed during the perforating operation.

(II) Description of the prior art

In the past, numerous methods have been proposed for the production of films such as thermoplastic films which have been perforated to increase the permeability thereof to gases and/or vapors while inhibiting the passage therethrough of liquids. Such a method is disclosed in U.S. Patent No. 2,689,379 wherein a process for perforating thermoplastic films is described which employs a hot metallic screen or a hard surface engraved with a screen grid pattern. It has been found, however, that when a film is perforated employing the process described therein, the resultant film product, although somewhat resistant to the passage of liquids such as water for example, will allow such liquids to penetrate with the application of very light pressure. Further, once water has been forced through such a film product, the holes therein are easily ruptured becoming quite enlarged and, after that, water will literally run through such a product like a screen. Further, when thermoplastic films are perforated employing such a screen grid, the resultant perforations are characterized by having extremely thin film portions around the periphery of the hole formed at the point of the intersecting wires comprising the screen grid. Such an extremely thin portion of film is quite undesirable in the case of thermoplastic films which contain plasticizer, employed to improve the flexibility of such films. The plasticizer in such thin film areas has a tendency to be washed out very rapidly during repeated washing cycles of such a film product resulting in such thinned out areas immediately surrounding the holes becoming so embrittled that they break off during normal usage of such a product. Additionally, it has been found that most thermoplastic films such as polyethylene for example, when perforated utilizing a wire screen grid in a continuous in-line perforating operation, have a tendency to stick to the metallic surface of such a screen grid which further interferes with and frequently precludes a smooth continuous perforating operation.

U.S. Patent No. 3,073,304 discloses a method of perforating thin thermoplastic films by passing such films through the nip formed by a pair of rollers. One of the rollers is a heated, smooth surfaced hard roller and the other a knurled or etched roller having a plurality of projections in the surface thereof for perforating the films. In addition to the obvious economic disadvantages attendant to the employment of engraved metallic rollers in such a process, there are control problems such as the tendency of the metallic projections to overheat and stick to the surface of the film due to the inherent high heat conductivity of such metal surfaces. Also, there is a natural tendency of such projections to be rapidly dulled by virtue of the continual pressure contact against the smooth surfaced roller thereby necessitating frequent replacement of the perforating roller.

Additionally and as noted in U.S. Patent No. 3,073,304, thermoplastic films, such as for example polyvinyls, in the absence of special back-up sheets or protective layers, have a tendency to deform and shrink when heated to the temperatures which are required to perforate such films. When attempts are made to internally cool such engraved metallic rollers in an attempt to dissipate heat from the surface projections thereon, it has been found that rapid heat dissipation from the heated smooth surfaced roller also occurs and usually results in either no or unsatisfactory film perforating.

SUMMARY OF THE INVENTION

In accordance with the present invention there is provided a method for increasing the permeability of thermoplastic films which comprises passing either single or multiple layers of films into the nip formed by a pair of counter-rotating rollers. One of the rollers, hereinafter referred to as the perforating roller, carries on its surface an evenly distributed layer of an abrasive material such as for example a garnet or an aluminum oxide type of abrasive. The other roller hereinafter referred to as the pressure roller, presses the thermoplastic film into contact with the abrasive coated surface of the perforating roller. The film is subsequently removed from the perforating roller utilizing a suitable take-off roller and finally is passed to a wind-up operation.

DESCRIPTION OF THE DRAWINGS

FIG. 5 is a diagrammatic view of another form of apparatus which may be employed in the method of the present invention.

FIG. 6 is an overhead view of roller 13' illustrated in FIG. 5.

FIG. 7 is a fragmentary cross-sectional view of roller 13' taken on line 7—7 of FIG. 6.

FIG. 8 is an overhead view of another form of perforating roller which may be employed with the apparatus illustrated in FIG. 5.

FIG. 9 is a schematic illustration of fresh fruit contained in a support tray which has been overwrapped utilizing the film product produced in accord with the method of the present invention.

DESCRIPTION OF SPECIFIC EMBODIMENTS

Figure 1:
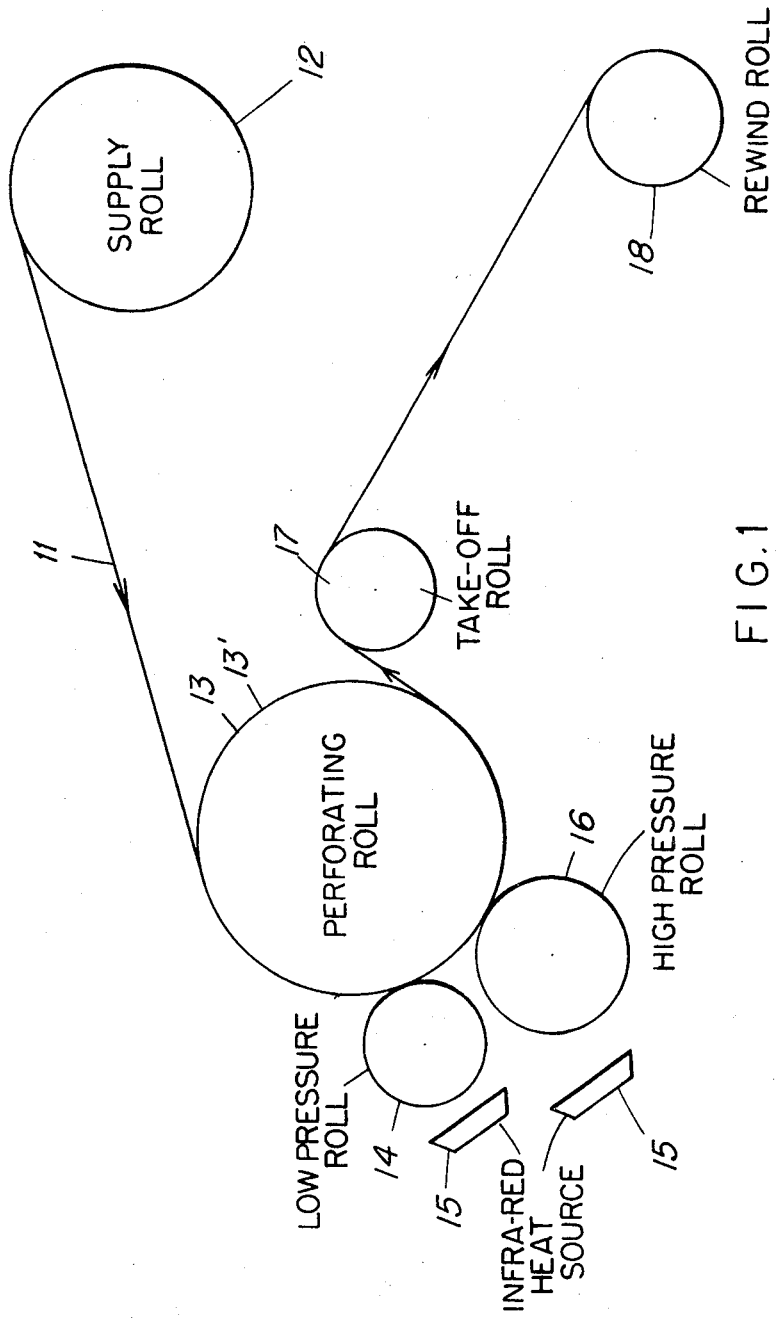
FIG. 1 is a diagrammatic view of one form of apparatus which may be employed in the method of the present invention.

It has been found that the semi-permeable film produced in accord with the method of the present invention is particularly useful for the packaging of fresh produce and fruits and the like. Semi-permeable film is a film which is relatively impervious to the passage of liquids such as water therethrough but allows passage of gases such as oxygen therethrough at a rate greater than, e.g. non-perforated thermoplastic film or film which has not been treated in accord with the method of the present invention.

Fruits and vegetables are generally harvested slightly before or at the time of ripening. They continue to live for a period of time which may vary from a few days to several months after which time the onset of senescence will occur. A reduction in temperature of most fruits and vegetables will slow down the living process and hence is a factor towards lengthening the span of time intermediate the harvesting and onset of senescence. However, in the case of some fruits such as bananas, for example, the side effects resulting from the reduction of temperature, in an attempt to preserve are more deleterious to the fruit than non-refrigerated storage. It is known that the ideal relative humidity for the storage of fruit and vegetables differs with the individual type of produce but generally falls in the range of from about 85% to about 95%. Applicant has found that when thermoplastic films which have been treated to increase the permeability thereof in accord with the method of the present invention, are employed in the overwrap packaging of fresh produce, the storage life of such goods is effectively prolonged as a result of the overwrap packaging material which maintains a relatively constant and optimum relative humidity within the package; controls the amount of carbon dioxide emitted from the fresh produce as a result of their respiratory cycle; and limits the amount of oxygen which is allowed to penetrate into the package from the exterior atmosphere.

Generally, the present process comprises applying pressure, either with or without the application of heat to a thermoplastic film positioned between two surfaces one of which is coated with abrasive material which is maintained at a temperature of from about 50° F. to about 120° F. and preferably about 70° F., and the other surface comprising a smooth or sand-blasted surface maintained either at room temperature or at elevated temperatures, i.e. above the softening point of the thermoplastic material being perforated. In accordance with the present method, the smooth surface roller, by variation of the temperature thereof, causes a resultant variation in the type of permeable film structure which is produced as will be more fully explained hereinafter.

In an application where it is desired to perforate either single or multiple layers such as for example a flattened tube of such film, the smooth surface roller may be maintained at room temperature, i.e. about 70° F. and under such conditions a mechanical punching or perforating of the thermoplastic film will result as a result of the individual abrasive grains present on the abrasive coated roller penetrating through the film and forming micropores therein. The periphery of the perforated portion of such film is characterized by having a slightly thinned area immediately surrounding the hole.

In accordance with the present method, it has also been found that single layers of thermoplastic film may be perforated by operating with the temperature of the smooth surface roller maintained at temperatures above room temperature and preferably above the softening point of the thermoplastic material to be perforated. As more clearly illustrated in FIGS. 4a through 4d, when elevated temperatures on the smooth surface roller are employed, i.e. temperatures above the softening point of the thermoplastic film, the surface of the film which is adjacent to and in contact with the hot smooth surface is near or above its melting point whereas the opposite surface of the film, i.e. that surface of the film which initially comes into contact with the abrasive coated roller is relatively cool. As pressure is applied to the thermoplastic film by bringing together the abrasive coated surface with the hot smooth surface, the abrasive grains are pressed through the plastic film layer to a point on the opposite side of the film adjacent the hot smooth surface. The relatively high temperature of the upper surface of the film causes softening of the plastic and hence relatively easy penetration of the grain. Immediately after the tip of the grain comes into contact with the heated smooth surface, the pressure on the hot surface is removed by virtue of the continuous rotation of the abrasive coated surface roller and the lower part of the film is raised on the grain due to contraction of the lower surface of the film. The film is lifted by virtue of such contraction in an amount sufficient to relieve any tension which may be on the film which, for example, in the case of 4 mil film is a little over 2 mils. At the instant that the grain penertates the film, the top surface of the film is melted and sticks slightly to the tip of the grain. Hence, as the bottom of the film is caused to rise, the top is pulled down forming a small somewhat conical opening.

It has been found that films, heat-perforated in accordance with the foregoing technique, are characterized by having an annular bead which completely surrounds each minute opening formed by the abrasive grains penetrating the film. The beads (or grommets) are formed as a result of the viscoelastic nature of the plastic material which has a tendency to recede from each abrasive grain as it penetrates the heated film. These annular beads or grommets result in the perforated film product being chararterized by having an improved tear resistance, as compared to cold perforated film material, in that once a tear is initiated in the perforated film, the thick annular beads or grommets in the path of such a tear have a tendency to retard, or stop completely, further propagation of the tear.

As hereinbefore indicated, a variety of abrasives may be employed on the perforating roller employed in the present method. Although the perforating roller may be directly coated with abrasive materials, which may be adhesively secured thereto, it has been found preferable to employ coated abrasives, commonly referred to as sandpaper, due to the ease of application to the roller surface, e.g. the abrasive coated paper or cloth may be simply adhesively secured around the surface of the perforating roller.

For purposes of the present invention it is not necessary that the entire surface of the perforating roller be covered with an abrasive material. Moreover, depending upon the type of permeable film product desired, it is sometimes desirable to use small or discrete, non-continuous areas of coated abrasive on the perforating roller, separated by areas with no abrasive. Film products produced with such a perforating roller will have patterned areas of increased permeability, said pattern corresponding to the pattern of the abrasive carried on the surface of the perforating roller.

Permeable film structures may be produced in accordance with the present invention, with hole sizes which may vary from less than about 0.5 mil in diameter up to about 8 to 10 mils in diameter and larger depending upon the desired end use application of the film product being produced.

The individual hole size, which determines the porosity of the final film product, is directly dependent upon the size of the individual abrasive grains employed in the abrasive coated roller; the amount of pressure applied to the nip of the counter-rotating perforating roller and the smooth surfaced roller; and in perforating operations where heat is employed on the smooth surfaced roller, the amount of heat employed influences the hole size of the permeable films. If the temperature of the smooth surfaced roller is below the softening point of the thermoplastic film being perforated, a mechanical perforation of the film occurs resulting in hole sizes of a fairly low magnitude whereas if the temperature of the smooth surfaced roller is maintained above the softening point of the thermoplastic film, an increase in the individual hole size results, the higher the temperature the larger the resultant hole size.

In the embodiment of the method and apparatus of the present invention as illustrated in FIG. 1, a single continuous layer of thermoplastic film 11 is fed from supply roller 12 onto the surface of rotating perforating roller 13. The surface of perforating roller 13 is covered with a continuous (or non-continuous) layer of abrasives, preferably coated abrasives such as a garnet type sandpaper for example, adhesively secured to the surface of roller 13. The coated abrasive may or may not cover the periphery of roller 13 depending upon the type of permeable film product desired and as hereinbefore discussed. After having passed onto the surface of abrasive covered roller 13, film 11 is carried by virtue of rotation of perforating roller 13 initially into the nip formed by perforating roller 13 with low pressure roller 14 (optional) and subsequently thereafter into the nip of high pressure roller 16 with perforating roller 13. The surface of low pressure roller 14 and high pressure roller 16 may be heated, for example, by the employment of infrared heat sources 15 positioned adjacent thereto. The smooth surfaced rollers 14 and 16 are preferably maintained at a temperature above the softening point of the particular film which it is desired to perforate. It is preferable to maintain the temperature of the film in contact with the coated abrasive surface of roller 13 at a temperature below about 120° F. and preferably as low as 70° F. and below. After the film passes through the nip formed by perforating roller 13 with high pressure roller 16, the perforated film is removed from the roller 13, for example by the employment of rotating take-off roller 17, and the film is subsequently passed to a wind-up roller 18 or onto further processing, for example a bag-making operation. It has been found that the coated abrasive, heat-perforating technique as aforedescribed is preferable for employment with single layer films. This is primarily due to the fact that by virtue of the relatively hard metallic surfaces of high pressure roller 16 and perforating roller 13, when multiple layers of film are perforated by passing it into the nip formed by the rotating heated pressure rollers with the cold perforating roller 13, such multiple layers of film have a tendency to fuse or block together in those areas where they are heat perforated with the coated abrasive grains.

In another embodiment of the method of the present invention, when it is desired to cold-perforate multiple layers of film as aforedescribed, whereby a mechanical perforation of each of the layers occurs, rather than the grommet encirclement of individual perforations as aforedescribed, the heating elements 15 need only to be removed and pressure rollers 14 and 16 allowed to run cool or at ambient temperatures.

Figure 2:
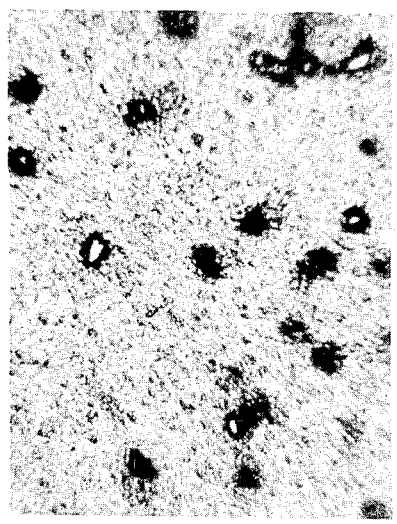
FIG. 2 is an enlarged reproduction of a photomicrograph of a thermoplastic film perforated in accord with the method of the present invention.
Figure 3:
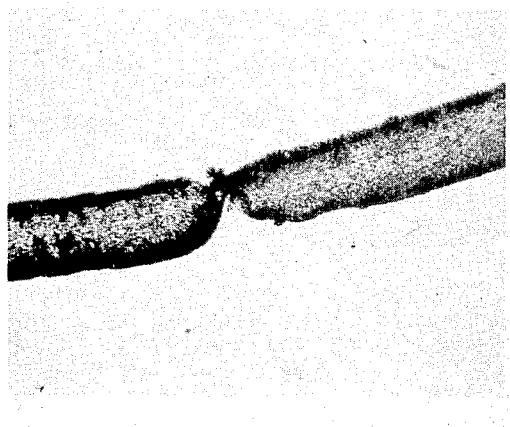
FIG. 3 is an enlarged reproduction of a photomicrograph which illustrates a cross section through a single perforation in a section of a thermoplastic film which has been perforated in accord with the method of the present invention.
Figure 4A:
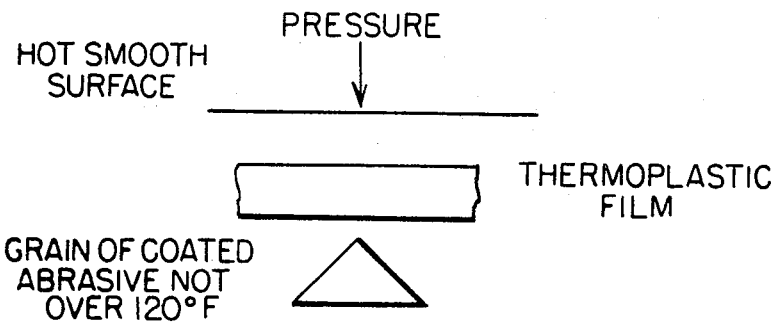
FIGS. 4a through 4d inclusive are enlarged diagrammatical representations of an individual film layer being perforated in accord with one embodiment of the method of the present invention.
Figure 4B:
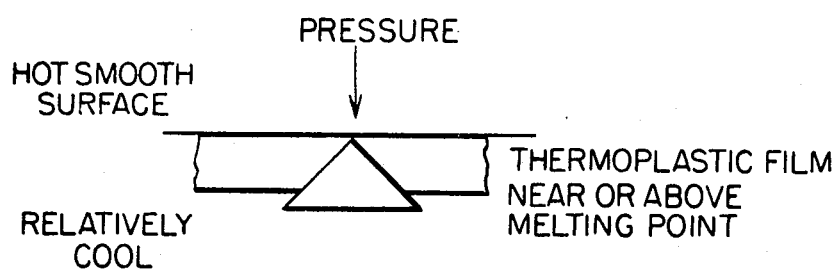
Figure 4C:
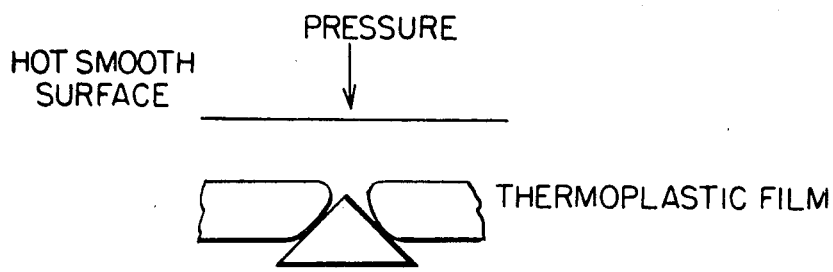
Figure 4D:
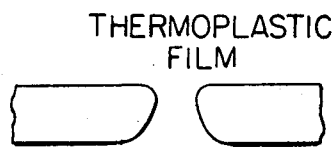

In a further embodiment of the film treatment method of the present invention high pressure roller 16 is covered with, or fabricated from, a resilient material. For example, materials such as silicone sponge covering have been found desirable. Heat is applied, either externally as illustrated in FIG. 2 with external heat source 15, or internally (not shown) for example by the circulation of heated fluids internally of roller 16.

It has been found that when high pressure roller 16 is fabricated from, or covered with, a resilient material such as silicone sponge, for example, the resultant film product exhibits increased permeability, however, the abrasive roller does not act upon the film to result in a film product which has holes formed completely through the film. The resultant product does, however, have a very thin membrane-like film at each point therein which corresponds to the tip of each of the abrasive grains which penetrate the film during its passage through the nip formed by the resilient pressure roller 16 and perforating roller 13. Such a film product is useful for the production of produce bags exhibiting increased moisture vapor transmission ratios and, simultaneously, by virtue of the fact that the film surface has not been completely penetrated by the abrasive grain, such a film product will prevent the passage therethrough of liquids such as water or extraneous solid contaminants. Additionally, it has been found that such a resilient surface on high pressure roller 16 is also desirable for high speed commercial operations. The resiliency of the surface of pressure roller 16 aids in the prevention of film tearing and damage as the film passes through the nip, which damage may occur for example as a result of unevenness or non-uniformity of curvature of rollers 13 and 16.

The following examples are employed to illustrate certain specific embodiments of the perforating and film treatment techniques employed in accord with the method of the present invention as aforedescribed and accordingly should not be construed in a limitative sense.

EXAMPLE 1

Heated non resilient pressure roller

A continuous polyvinyl chloride film, 3.75 mils thick, was continuously fed from supply roller 12 at a rate of about 20 ft. per minute, onto the surface of perforating roller 13. Perforating roller 13 was completely covered with an 80 grain garnet abrasive paper adhesively secured thereto. The vinyl film was carried around the surface of rotating perforating roller 13, through the nip formed by low pressure roller 14, and subsequently into the nip formed by high pressure roller 16 pressing against perforating roller 13. The pressure at the nip between rollers 13 and 16 was approximately 40 lb. per square inch. High pressure roller 16 had a smooth aluminum surface which was heated to a temperature of 280° F. utilizing infrared heat source 15. After emerging from the nip formed by pressure roller 16 and perforating roller 13, the film was removed from roller 13 utilizing rotating take-off roller 17 and subsequently passed to wind-up on rewind roller 18.

The polyvinyl chloride film produced in accord with Example 1 was found to have at least a tenfold increase in the moisture vapor transmission ratio thereof in comparison to an unperforated film of identical thickness composition. The perforated film was also found to serve as an effective barrier to the transmission of liquid, such as water, therethrough. The material produced in accord with Example 1 has been successfully used in the fabrication of baby-pants.

EXAMPLE 2

Heated non resilient pressure roller

A continuous polyethylene film, 1 mil thick, was continuously fed from supply roller 12 at a rate of about 20 ft. per minute onto the surface of perforating roller 13. Perforating roller 13 was covered with a 120 grain garnet abrasive paper adhesively secured thereto, comprising individual abrasive discs ¼" in diameter and spaced on one inch centers in a random pattern. The polyethylene film was carried around the surface of rotating perforating roller 13 through the nip formed by low pressure roller 14 and subsequently into the nip formed by high pressure roller 16 pressing against perforating roller 13. The pressure at the nip between rollers 13 and 16 was approximately 40 lb. per square inch. High pressure roller 16 had a smooth aluminum surface which was heated to a temperature of 280° F. utilizing infrared heat source 15. After emerging from the nip formed by pressure roller 16 and perforating roller 13, the film was removed from roller 13 utilizing rotating take-off roller 17 and subsequently passed to wind-up on rewind roller 18.

The polyethylene film produced in accord with Example 2 was found to have at least a tenfold increase in the moisture vapor transmission ratio thereof, in comparison to an unperforated film of identical thickness and composition. The perforated film was also found to serve as an effective barrier to the transmission of liquid, such as water, therethrough. Such a material has been found to be useful in the fabrication of produce bags.

EXAMPLE 3

Unheated non resilient pressure roller

A continuous polyethylene film, 1 mil thick, was continuously fed from supply roller 12 at a rate of about 20 ft. per minute onto the surface of perforating roller 13. Perforating roller 13 was covered with a 120 grain garnet abrasive paper adhesively secured thereto. The polyethylene film was carried around the surface of rotating perforating roller 13 through the nip formed by low pressure roller 14 and subsequently into the nip formed by high pressure roller 16 pressing against perforating roller 13. The pressure at the nip between rollers 13 and 16 was approximately 20 lb. per square inch. High pressure roller 16 had a smooth aluminum surface which was maintained at room temperature or approximately 70° F. After emerging from the nip formed by pressure roller 16 and perforating roller 13, the film was removed from roller 13 utilizing rotating take-off roller 17 and subsequently passed to wind-up on rewind roller 18.

The polyethylene film produced in accord with Example 3 was found to have at least a tenfold increase in the moisture vapor transmission ratio thereof in comparison to an unperforated film of identical thickness and composition. The perforated film was characterized by having micropores therein, the edges of which were relatively thin in comparison to the adjacent film thicknesses. Further, the periphery of the micropores were not circumscribed by grommets of relatively thick molten thermoplastic as was the case with the periphery of micropores present in the film produced in accord with Examples 1 and 2.

EXAMPLE 4

Heated resilient pressure roller

A continuous polyethylene film, 1 mil thick, was continuously fed from supply roller 12 at a rate of about 20 ft. per minute onto the surface of perforating roller 13. Perforating roller 12 was covered with a 120 grain garnet abrasive paper adhesively secured thereto. The polyethylene film was carried around the surface of rotating perforating roller 13 through the nip formed by low pressure roller 14 and subsequently into the nip formed by high pressure roller 16 pressing against perforating roller 13. The pressure at the nip between rollers 13 and 16 was approximately 20 lb. per square inch. High pressure roller 16 had a resilient surface comprising a silicone sponge material which was adhesively secured to the surface of roller 16. The resilient surface of roller 16 was heated to a temperature of 140° F. utilizing infrared heat source 15. After emerging from the nip formed by pressure roller 16 and perforating roller 13, the film was removed from roller 13 utilizing rotating take-off roller 17 and subsequently passed to wind-up on rewind roller 18.

The polyethylene film produced in accord with Example 4 was found to have at least a tenfold increase in the moisture vapor transmission ratio thereof, in comparison to an untreated film of identical thickness and composition. The film produced in accord with Example 4 was further characterized in that the perforations formed by the tips of the abrasive grains did not extend completely through the film thickness. Extremely thin membranes of film material, corresponding to the positions of the penetration by the individual abrasive grain, were found to exist in each area of perforation. The moisture vapor transmission ratio of film produced in accord with Example 4 was relatively lower in comparison to that of the films produced in accord with Examples 1 through 3.

In accordance with another specific embodiment of the method of the present invention, applicant has found that films with a high degree of permeability, i.e. permeabilities on the order of at least 100 cc./sq. c./min. may be produced utilizing abrasive coated surface characterized by the abrasive coating material being arranged in strips on the periphery of the roller whereby there is spacing adjacent either side of the abrasive coated strips.

EXAMPLE 5

Unheated resilient pressure roller-discontinuous coated abrasive surface

A continuous polyethylene film 11', 1 mil thick, was continuously fed from supply roller 12' (see FIG. 5) at a rate of about 20 feet per minute, under idler roller 19, and onto the surface of perforating roller 13'. Roller 13' was a 6-inch diameter steel roll covered with a parallel series of ⅛ inch wide strips 13" of coated abrasive (aluminum oxide-grain size 36) spaced ⅛ inch apart and positioned parallel to the direction of film advancement. The film 11' was passed into the nip formed by roller 13' and counter rotating roller 16'. Roller 16' was a 2-inch diameter silicone sponge coated roll. In the nip, the pressure of the silicone sponge anchored the polyethylene film onto the tips of the abrasive grains carried on the surface of the ⅛ inch wide strips. Simultaneously, the film was stretched into the cavities between the strips 13" and the resultant stretching pulled large holes into the film. The perforated film was continuously withdrawn from the nip formed by rollers 13' and 16' and was taken up on rewind roll 18'.

Thus, it will be seen that in accordance with preceding Example 5, thermoplastic film was perforated utilizing a process whereby perforation is effected by pulling of the film over the abrasive granules, which, in turn, causes penetration of the abrasive granules into the film by the process of the sponge covering on roller 16' pushing the film down into the cavities between the abrasive coated strips 13".

It has been found that in accordance with the preceding Example 5, suitable perforation of the film is accomplished utilizing parallel strips of abrasive coated material approximately 1/8 inch wide. Narrower abrasive strips may also be employed. However, it has been found that when the width of the abrasive coated strips exceeds about 1/4 inch, penetration of the film by the abrasive granules was unsatisfactory.

As shown in FIG. 8, the arrangement of the spaced, abrasive coated strips on the surface of perforating roll 13' may be perpendicular to the direction of film advancement over roll 13'. It has been found that such an arrangement is equally effective in achieving a satisfactory perforation of the film, as the arrangement of strips 13" illustrated in FIG. 6.

Film produced in accord with the method described in Example 5, in addition to its utility as a fresh produce overwrap packaging material, has been found particularly suitable for employment as a banana shroud material. Banana shrouds are employed to protect stalks of bananas as they are growing. Generally, when employing thermoplastic shrouds for this purpose, relatively large ventilation holes must be punched in the film to create a chimney effect to insure proper oxygen supply to the growing stalk of fruit. It has now been found that such protective shrouds may be formed utilizing the permeable film material produced in accord with the preceding example whereby the stalk may be completely encased in such film. As a result of the film's relatively high permeability, such complete encasement does not interfere with the normal growth of the fruit. Moreover, complete encasement results in elimination of insects attacking the fruit as well as excluding spores from settling on the fruit during the growing process. Such advantages were not derived from the prior art ventilated shrouds formed from non-perforated thermoplastic film materials.

Although the present invention has been described with preferred embodiments, it is to be understood that modifications and variations may be resorted to, without departing from the spirit and scope of this invention, as those skilled in the art will appreciate. Such variations and modifications are therefore considered to be within the purview and scope of the appended claims.

What is claimed is:

1. A method of microperforating thermoplastic film comprising providing a pair of spaced rollers having a nip therebetween; providing abrasive grains on the surface of one of said rollers; passing said thermoplastic film through the nip of said pair of rollers; adjusting the pressure and temperature in the nip of said rollers to permit perforation of said film by said abrasive grains; microperforating said film at the points of contact thereof with said abrasive grains; and removing said microperforated film from the nip of said rollers.

2. A method in accordance with claim 1 wherein said abrasive grain is garnet.

3. A method in accordance with claim 1 wherein said pressure roller is heated.

4. A method in accordance with claim 1 wherein the surface of said pressure roller is resilient.

5. A method in accordance with claim 1 wherein the surface of said second roller is completely covered with said abrasive grain coated material.

6. A method in accordance with claim 1 wherein the surface of said second roller is characterized by having thereon an abrasive grain coated material covering which is discontinuous and arranged in predetermined pattern.

7. A method in accordance with claim 1 wherein said abrasive grain is in strips positioned around the periphery of said second roller, parallel to the direction of film movement through said nip.

8. A method in accordance with claim 7 wherein said abrasive grain strips are positioned across the periphery of said second roller, perpendicular to the direction of film movement through said nip.

9. A method as claimed in claim 1 including providing said abrasive grains on the other of said rollers.

References Cited

UNITED STATES PATENTS

| | | | |
|---|---|---|---|
| 2,915,787 | 12/1959 | Ewing et al. | 264—284 |
| 2,924,863 | 2/1960 | Chavannes | 264—DIG. 70 |
| 3,243,488 | 3/1966 | Hannauer, Jr. et al. | 83—16 X |
| 2,068,456 | 1/1937 | Hooper et al. | 83—2 X |
| 2,442,598 | 6/1948 | Harrison et al. | 264—284 |
| 2,689,379 | 9/1954 | Nissel | 264—154 |
| 3,227,019 | 1/1966 | Schur | 83—30 |
| 3,540,959 | 11/1970 | Connor | 264—284 X |
| 2,550,366 | 4/1951 | Meaker | 219—384 X |
| 3,147,658 | 9/1964 | Boyd | 83—660 X |

JAMES M. MEISTER, Primary Examiner

U.S. Cl. X.R.

83—171, 660; 264—154, DIG. 70